(12) United States Patent
Clune

(10) Patent No.: US 7,601,284 B2
(45) Date of Patent: Oct. 13, 2009

(54) MOLDING FASTENER ELEMENTS ON FOLDED SUBSTRATE

(75) Inventor: William P. Clune, Hillsborough, NH (US)

(73) Assignee: Velcro Industries B.V., Curacao (NL)

( * ) Notice: Subject to any disclaimer, the term of this patent is extended or adjusted under 35 U.S.C. 154(b) by 784 days.

(21) Appl. No.: 11/100,293

(22) Filed: Apr. 6, 2005

(65) Prior Publication Data

US 2006/0226571 A1    Oct. 12, 2006

(51) Int. Cl.
*D01D 5/20* (2006.01)
*A44B 18/00* (2006.01)
*B29C 51/22* (2006.01)

(52) U.S. Cl. ............ 264/167; 24/442; 24/449; 28/161; 264/172.19; 428/100

(58) Field of Classification Search ............ 264/167, 264/172.19, 252; 24/442, 449, 451; 28/161; 428/100
See application file for complete search history.

(56) References Cited

U.S. PATENT DOCUMENTS

| 3,507,010 | A | 4/1970 | Doleman et al. |
|---|---|---|---|
| 3,594,863 | A | 7/1971 | Erb |
| 3,594,865 | A | 7/1971 | Erb |
| 3,608,035 | A | 9/1971 | Frohlich |
| 4,097,634 | A | 6/1978 | Bergh |
| 4,592,118 | A | 6/1986 | DeWoskin |
| 4,725,221 | A | 2/1988 | Blanz |
| 4,732,800 | A | 3/1988 | Groshens |
| 4,775,310 | A | 10/1988 | Fischer |
| 4,794,028 | A | 12/1988 | Fischer |
| 4,854,735 | A | 8/1989 | Rutledge |
| 4,872,243 | A | 10/1989 | Fischer |
| 4,933,224 | A | 6/1990 | Hatch |
| 4,999,067 | A | 3/1991 | Erb et al. |
| 5,116,563 | A | 5/1992 | Thomas et al. |
| 5,212,853 | A | 5/1993 | Kaneko |
| 5,250,253 | A | 10/1993 | Battrell et al. |
| 5,256,231 | A | 10/1993 | Gorman et al. |
| 5,260,015 | A | 11/1993 | Kennedy et al. |
| 5,312,456 | A | 5/1994 | Reed et al. |

(Continued)

FOREIGN PATENT DOCUMENTS

DE    1944313    3/1971

(Continued)

*Primary Examiner*—Monica A Huson
*Assistant Examiner*—Michael T Piery
(74) *Attorney, Agent, or Firm*—Fish & Richardson P.C.

(57) ABSTRACT

A method for forming a fastener product includes folding a sheet material about a longitudinal fold line to form a longitudinal edge portion overlapping only an adjacent portion of the sheet material, leaving another portion of the sheet material exposed as a remainder portion. The folded sheet material is continuously introduced to a gap adjacent to a surface of a rotating mold roll. Moldable resin is introduced between the sheet material and the mold roll to fill fixed cavities in the rotating mold roll to form portions of the fastener elements as stems bonded to one of the overlapping edge portion and the remainder portion. Additional material is bonded to the other of the overlapping edge portion and the remainder portion with the bonding occurring in the gap. The resin is solidified, then, stripped from the surface of the mold roll by pulling the stems from their respective cavities.

20 Claims, 7 Drawing Sheets

U.S. PATENT DOCUMENTS

| | | | |
|---|---|---|---|
| 5,326,415 A | 7/1994 | Thomas et al. | |
| 5,326,612 A | 7/1994 | Goulait | |
| 5,393,475 A | 2/1995 | Murasaki et al. | |
| 5,407,439 A | 4/1995 | Goulait | |
| 5,460,769 A | 10/1995 | Kaneko | |
| 5,512,234 A | 4/1996 | Takizawa et al. | |
| 5,518,795 A | 5/1996 | Kennedy et al. | |
| 5,591,146 A | 1/1997 | Hasse et al. | |
| 5,606,781 A | 3/1997 | Provost et al. | |
| 5,611,791 A | 3/1997 | Gorman et al. | |
| 5,614,281 A | 3/1997 | Jackson et al. | |
| 5,656,111 A | 8/1997 | Dilnik et al. | |
| 5,669,120 A | 9/1997 | Wessels et al. | |
| 5,679,302 A * | 10/1997 | Miller et al. | 264/167 |
| 5,744,080 A | 4/1998 | Kennedy et al. | |
| 5,755,015 A | 5/1998 | Akeno et al. | |
| 5,769,832 A | 6/1998 | Hasse et al. | |
| 5,797,170 A | 8/1998 | Akeno | |
| 5,857,245 A | 1/1999 | Sakakibara et al. | |
| 5,900,350 A | 5/1999 | Provost et al. | |
| 5,945,131 A | 8/1999 | Harvey et al. | |
| 5,945,193 A | 8/1999 | Pollard et al. | |
| 5,997,522 A | 12/1999 | Provost et al. | |
| 6,035,498 A | 3/2000 | Buzzell et al. | |
| 6,060,009 A | 5/2000 | Welygan et al. | |
| 6,106,922 A | 8/2000 | Cejka et al. | |
| 6,115,891 A | 9/2000 | Suenaga et al. | |
| 6,132,755 A | 10/2000 | Eicher et al. | |
| 6,174,476 B1 | 1/2001 | Kennedy et al. | |
| 6,180,205 B1 | 1/2001 | Tachauer et al. | |
| 6,202,260 B1 | 3/2001 | Clune et al. | |
| 6,205,623 B1 | 3/2001 | Shepard et al. | |
| 6,224,807 B1 | 5/2001 | Clune | |
| 6,248,419 B1 | 6/2001 | Kennedy et al. | |
| 6,303,062 B1 | 10/2001 | Aamodt et al. | |
| 6,312,612 B1 | 11/2001 | Sherman et al. | |
| 6,363,587 B1 | 4/2002 | Richter et al. | |
| 6,406,467 B1 | 6/2002 | Dilnik et al. | |
| 6,451,240 B1 | 9/2002 | Sherman et al. | |
| 6,470,540 B2 | 10/2002 | Aamodt et al. | |
| 6,481,063 B2 | 11/2002 | Shepard et al. | |
| 6,484,371 B1 | 11/2002 | Romanko et al. | |
| 6,489,003 B1 | 12/2002 | Levitt et al. | |
| 6,531,207 B1 | 3/2003 | Eaton et al. | |
| 6,610,382 B1 | 8/2003 | Kobe et al. | |
| 6,617,020 B2 | 9/2003 | Zhou et al. | |
| 6,635,212 B2 | 10/2003 | Melbye et al. | |
| 6,640,348 B1 | 11/2003 | Clune et al. | |
| 6,827,893 B2 | 12/2004 | Clune | |
| 6,835,256 B2 | 12/2004 | Menzies et al. | |
| 6,875,710 B2 | 4/2005 | Eaton et al. | |
| 7,037,457 B2 | 5/2006 | Seidel et al. | |
| 7,048,818 B2 | 5/2006 | Krantz et al. | |
| 2001/0000547 A1 | 5/2001 | Tachauer et al. | |
| 2001/0016245 A1 | 8/2001 | Tuman et al. | |
| 2001/0018110 A1 | 8/2001 | Tuman et al. | |
| 2002/0022108 A1 | 2/2002 | Krantz et al. | |
| 2002/0023321 A1 | 2/2002 | Clune | |
| 2003/0034583 A1 | 2/2003 | Provost | |
| 2003/0074768 A1 * | 4/2003 | Shepard et al. | 24/30.5 R |
| 2003/0087059 A1 | 5/2003 | Jackson et al. | |
| 2004/0088835 A1 | 5/2004 | Tachauer et al. | |
| 2004/0222551 A1 | 11/2004 | Provost et al. | |
| 2005/0101930 A1 | 5/2005 | Tachauer et al. | |
| 2005/0116374 A1 | 6/2005 | Ogawa et al. | |

FOREIGN PATENT DOCUMENTS

| | | |
|---|---|---|
| EP | 0714614 | 11/1999 |
| WO | WO 99/17631 | 4/1999 |
| WO | WO 99/48455 | 9/1999 |
| WO | WO 00/27235 | 5/2000 |
| WO | WO 00/27721 | 5/2000 |
| WO | WO 02/096233 | 12/2002 |
| WO | WO2004/058584 | 7/2004 |
| WO | WO 2005/018879 | 3/2005 |

* cited by examiner

MOLDING FASTENER ELEMENTS ON FOLDED SUBSTRATE

TECHNICAL FIELD

This invention relates to molding fastener elements on a folded substrate.

BACKGROUND

Touch fastener products have been produced in a continuous molding process, in which a plastic resin strip base is molded with integral fastener element stems extending from one surface. Typically, this molding is performed in a high pressure nip, such as between two counter-rotating rollers or against a single roller that defines miniature cavities in its peripheral surface, for molding either fastener element stems or complete fastener elements. To fill the miniature cavities at a high rate of speed, significant nip pressure is required. The calender nip is typically quite thin, for molding a correspondingly thin and flexible fastener element base. Because of the delicate nature of the surface of the molding roll, and the expense of producing such rolls, care must be taken to avoid roll surface damage.

Kennedy et al., U.S. Pat. No. 5,260,015, disclosed that, with proper controls, some preformed sheet materials could be introduced to the calender nip for in situ lamination to the base of the fastener element tape while the tape was being molded, under conditions that would not impede the filling, cooling and removal of fastener element stems from their respective cavities, nor cause local damage to the molding roll surface. Clune, U.S. Pat. No. 6,827,893, disclosed that a folded web could be introduced to the calender nip for in situ lamination to the base of the fastener element tape to form a tab section adjacent to a fastener tape section of the fastener product.

SUMMARY

In one aspect of the invention, a method for forming a fastener product having multiplicities of fastener elements extending from a strip form base includes folding a sheet material about a first longitudinal fold line to form a first longitudinal edge portion overlapping only a first adjacent portion of the sheet material, leaving another portion of the sheet material exposed as a primary remainder portion. The folded sheet material is continuously introduced to a gap defined adjacent to a peripheral surface of a rotating mold roll. Moldable resin is introduced between the sheet material and the mold roll, such that the resin fills an field of fixed cavities defined in the rotating mold roll to form an field of molded stems bonded to one of the first longitudinal edge portion and the primary remainder portion. An additional material is also introduced to the gap, such that the additional material is bonded to the other of the first longitudinal edge portion and the primary remainder portion. Preferably, the folded sheet material, the moldable resin, and the additional material are introduced simultaneously. Engageable heads are formed on the molded stems. The resin is solidifying; and, then, the solidified resin is stripped from the peripheral surface of the mold roll by pulling the stems from their respective cavities. The method can also include, after stripping, unfolding the sheet material to its original width.

In some embodiments, the engageable heads are formed by molding the heads on the stems in the cavities of the mold roll. Alternatively, the engageable heads can be formed by deforming resin of the molded stems after stripping the solidified resin from the peripheral surface of the mold roll. The molded stems can be deformed by applying heat and pressure to distal ends of the stems.

Bonding an additional material to the other of the first longitudinal edge portion and the primary remainder portion can include introducing moldable resin between the sheet material and the mold roll, to fill a second field of fixed cavities defined in the rotating mold roll and form a second field of molded stems bonded to the other of the first longitudinal edge portion and the primary remainder portion. Alternatively, it can include introducing a loop material between the sheet material and the mold roll, such that the loop material is laminated to the other of the first longitudinal edge portion and the primary remainder portion. In such cases, the loop material can be a non-woven fabric.

In some embodiments, the gap is a nip defined between the rotating mold roll and a counter-rotating pressure roll.

In some embodiments, before introducing the folded sheet material to the gap, the sheet material is folded about a second longitudinal fold line in the primary remainder portion to form a second longitudinal edge portion overlapping a second adjacent portion of the primary remainder portion. The second longitudinal fold line can bisect the primary remainder portion such that the second longitudinal edge portion abuts the first longitudinal edge portion or a portion of the primary remainder portion adjacent to the overlapped first adjacent portion can remain exposed to the mold roll.

In embodiments featuring two fold lines, the field of molded stems can be bonded to the first or second longitudinal edge portion with, in some cases, the additional material, such as molded stems or loop material, bonded to the other longitudinal edge portion.

The embodiments discussed above describe molding portions of fastener elements to one portion of a folded sheet material while bonding additional material (e.g., laminating loop material or in-situ molding and laminating hooks) to another portion of the folded sheet material. Bonding additional material to the sheet material can also include, for example, laminating a preformed strip with fastener elements, such as hooks, loops, or stems with loop-engageable heads, to the sheet material.

Systems and methods embodying aspects of the invention described above efficiently produce a fastener product with fastener elements on each of two opposing faces. This system and method can also produce single- or double-sided fastener products that are wider than the calender molding apparatus used in the process. This may reduce machining costs and enable the production of wider fastener products for a given calender molding apparatus.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
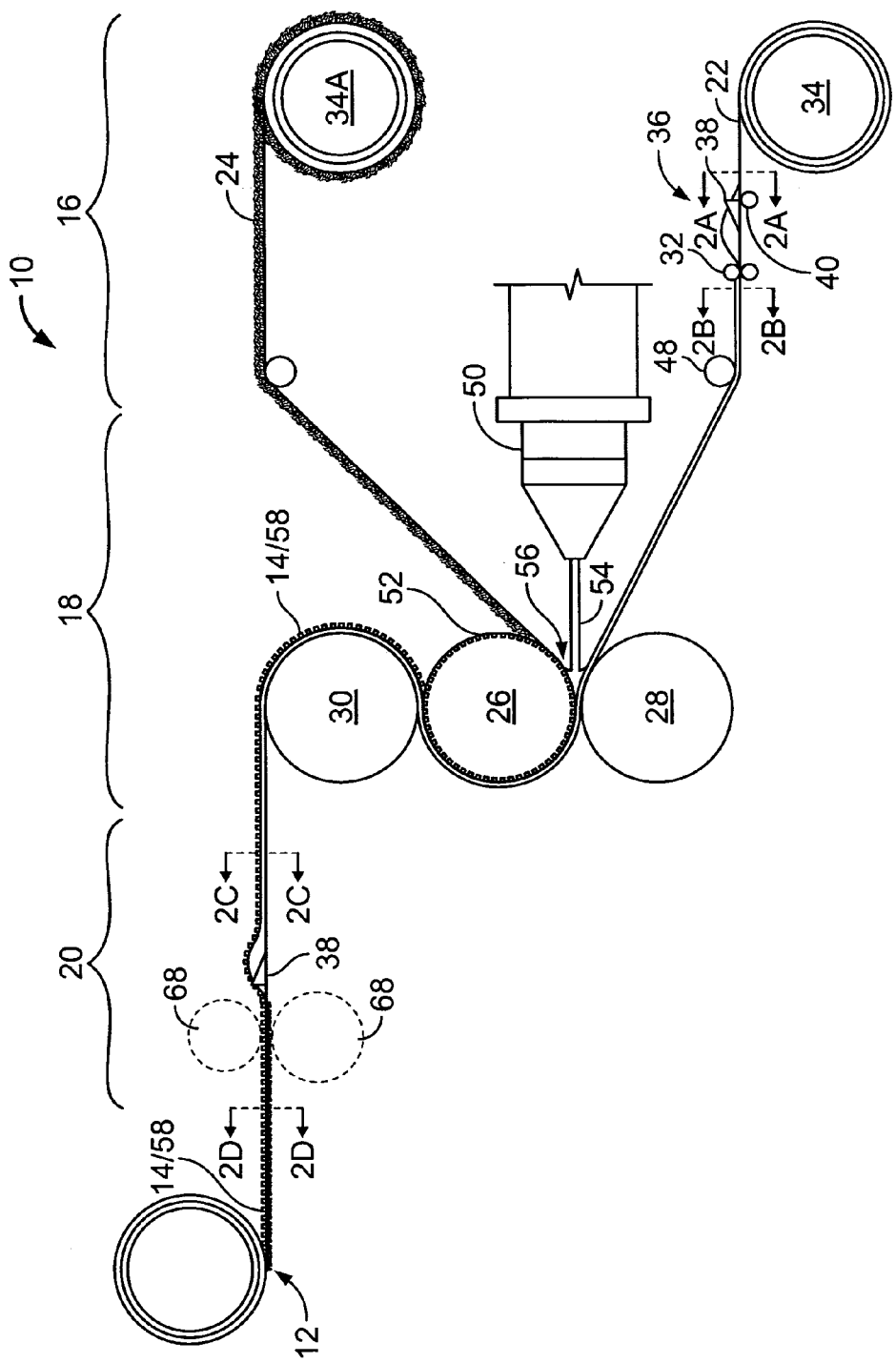
FIG. 1A is a somewhat diagrammatic side view of a system for forming a fastener product with fastener elements on each of two opposing sides.
Figure 1B:
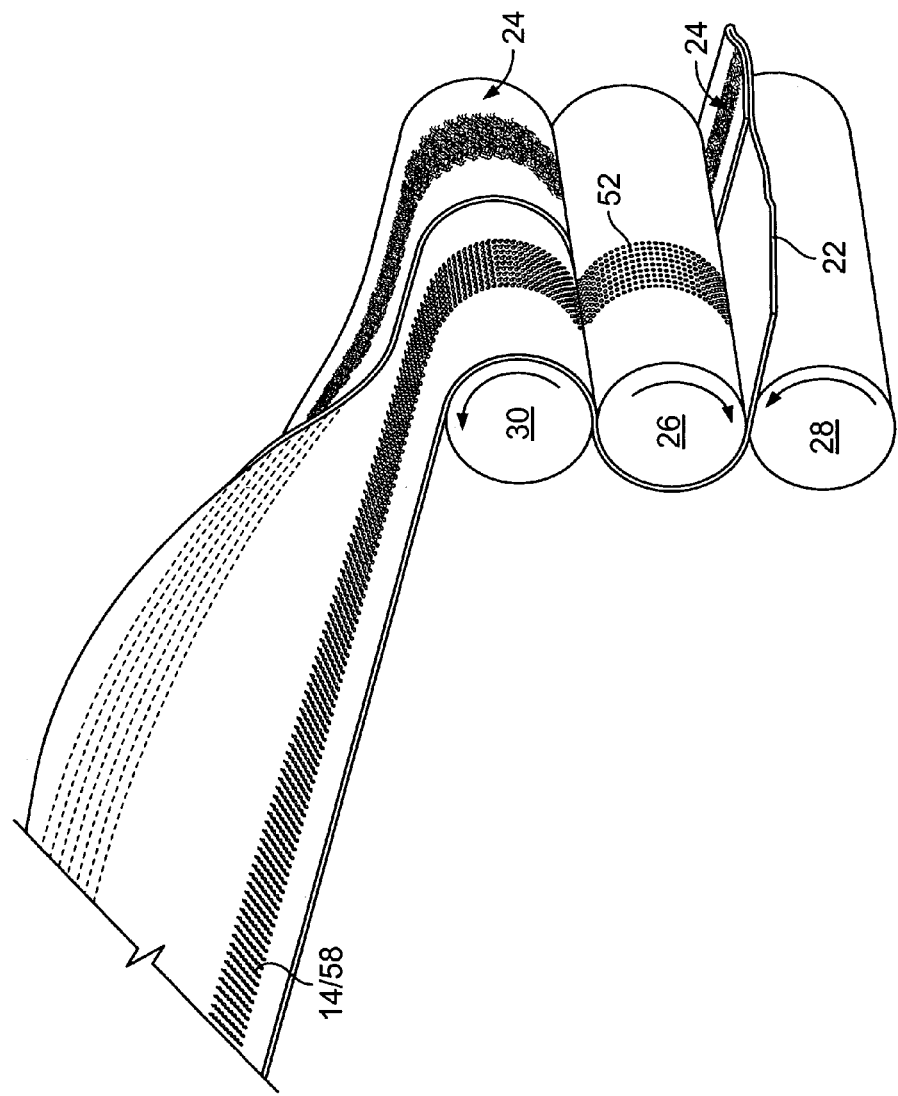
FIG. 1B is a perspective view of the mold, pressure, and takeoff rolls of the system shown in FIG. 1A.

Referring to FIGS. 1A and 1B, a manufacturing system 10 is employed to produce a fastener product 12 with fastener elements 14 on each of two opposing surfaces of the fastener product. In a preferred form, the system employs the roll molding apparatus of the general type shown in U.S. Pat. No. 4,872,243 issued to Fischer, the details of which are hereby incorporated by reference.

The manufacturing system 10 includes a sheet feed subsystem 16, a calender molding apparatus 18, and a post-processing subsystem 20. The major components of the manufacturing system 10 are shown in FIG. 1A while, for clarity of illustration, only sheet material 22, non-woven loop material 24, and the rollers 26, 28, 30 of the calender molding apparatus are shown in FIG. 1B. Cross-sections of the sheet material 22 along the process path are shown in FIGS. 2A-2D.

In the sheet feed subsystem 16, tensioning rollers 32 pull the folded sheet material 22 from a feed roll 34 through a folding station 36 where a wedge 38 and a roller 40 cooperate to fold the sheet material 22 along a longitudinal fold line 42. This forms a longitudinal edge portion 44 overlapping only a portion of the sheet material 22 and leaves another portion of the sheet material exposed as a primary remainder portion 46. The folded sheet material 22 passes a guide roller 48 and is fed into the calendar molding apparatus 18 with the non-woven loop material 24 from a second feed roller 34A.

The roll molding apparatus includes a temperature-controlled cylindrical mold roll 26, a temperature-controlled cylindrical pressure roll 28, a takeoff roll 30, and an extruder die 50. The mold roll 26 has fields of small mold cavities 52 in its peripheral surface, for example mold cavities shaped to form stems of heights in the range between about 0.005 and 0.050 inch. The mold roll 26 and pressure roll 28 are counter-rotating rolls that define a calender nip 56. The sheet feed subsystem 16 feeds folded sheet material 22 into the calender nip 56 with both the longitudinal edge portion 44 and the primary remainder portion 46 exposed to the mold roll 26. The extruder die 50 extrudes moldable resin 54 in a moldable sheet that is led into the calender nip 56 between the folded sheet material 22 and the mold roll 26. The motion of the counter-rotating surfaces draws the moldable sheet into the calender nip 56. The pressure of the calendar nip 56 forces the moldable resin sheet into mold cavities 52 where it is cooled and solidified. Tension applied by the takeoff roll 30 to the folded sheet material 22 pulls the solidified fastener elements 14 from the mold cavities. Simultaneously, the non-woven loop material 24 is fed in to the calender nip 56 between the mold roll 26 and the primary remainder portion 46 where it is laminated to the primary remainder portion.

The distribution of mold cavities 52 in the peripheral surface of the mold roll 26 determines the distribution of molded fastener elements 14. Extruding the resin 54 as a moldable sheet forms the fastener elements as stems extending from a continuous base sheet that is laminated to the folded sheet material. In the illustrated apparatus, mold cavities are arranged to produce a continuous band of hooks 58 laminated to the longitudinal edge portion 44. In other embodiments, mold cavities are arranged to produce a continuous band of hooks laminated to primary remainder portion and the non-woven loop material is bonded to the longitudinal edge portion. In addition, the mold cavities 52 can be spaced in discrete islands and the moldable resin is extruded in discrete amounts registered to the islands. Similarly, the spacing between mold and pressure rolls 26, 28 at the calender nip 56 can be adjusted so that individual fastener elements are laminated to the folded sheet material.

Following the calender nip 56, the thermoplastic continues on the surface of the rotating temperature-controlled mold roll 26 until the resin is sufficiently solidified to enable removal from the mold roll 26. The web is led from the mold roll 26, about takeoff roll 30 to the post-processing subsystem 20 by applied tension.

Figure 2A:
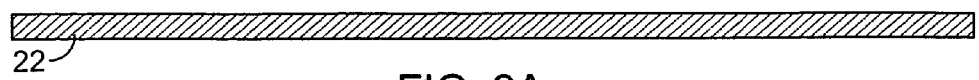
FIGS. 2A-2D are cross-sectional views, taken along lines 2A-2A, 2B-2B, 2C-2C and 2D-2D, respectively, in FIG. 1A.
Figure 2B:
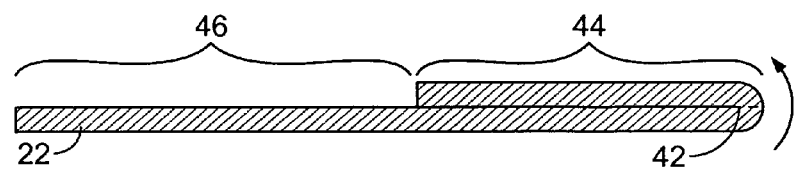
Figure 2C:
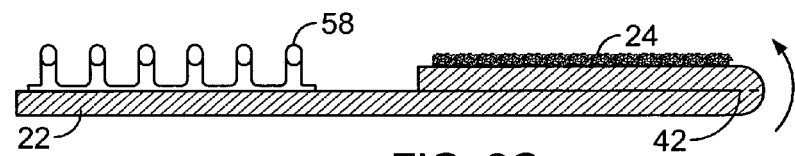
Figure 2D:
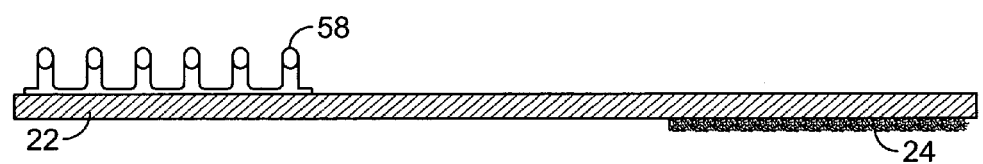
Figure 2E:
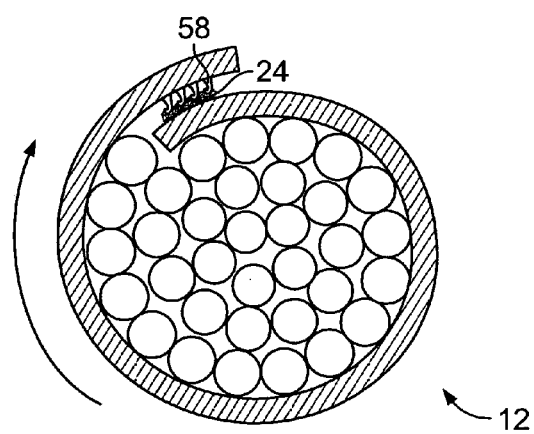
FIG. 2E is a cross-section of the fastener product shown in FIG. 2D wrapped about a bundle of wires.

In the post-processing subsystem 20, a wedge 38 unfolds the folded sheet material 22. After unfolding, the sheet material 22, with fastener elements on each of its two opposing faces, proceeds to take-up roll 60. In some embodiments, the fastener elements are engagement-ready crook-shaped hooks 58 and non-woven loop material 24 (see FIGS. 2C and 2D). The sheet material 22 can be cut to produce fastener products 12 useful in a variety of applications including, for example, as a wrap-tie as shown in FIG. 2E. In the illustrated application, the hooks 58 releasably engage the non-woven loop material 24 to securely gather a number of wires into a bundle for easy transportation.

Figure 3A:
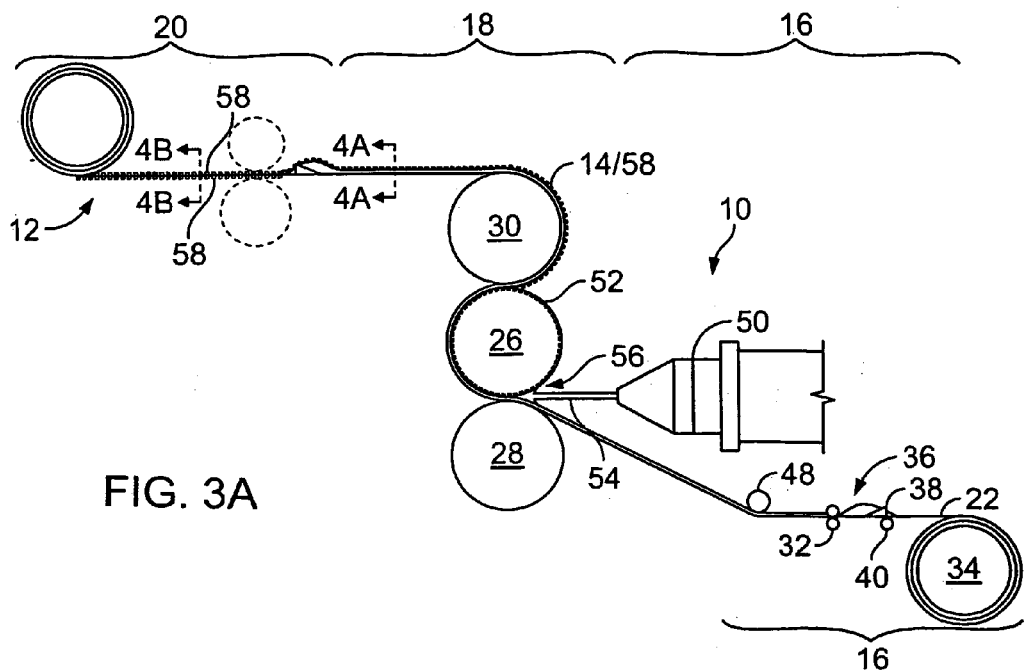
FIG. 3A is a somewhat diagrammatic side view of an alternate system for forming a fastener product with fastener elements on each of two opposing sides.
Figure 3B:
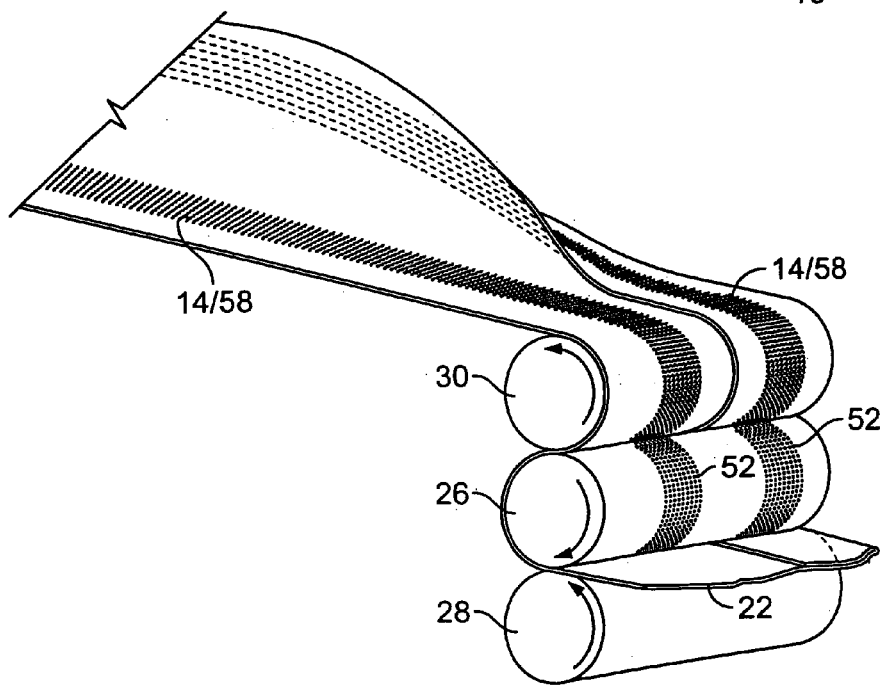
FIG. 3B is a perspective view of the mold, pressure, and takeoff rolls of the system shown in FIG. 3A.
Figure 4A:
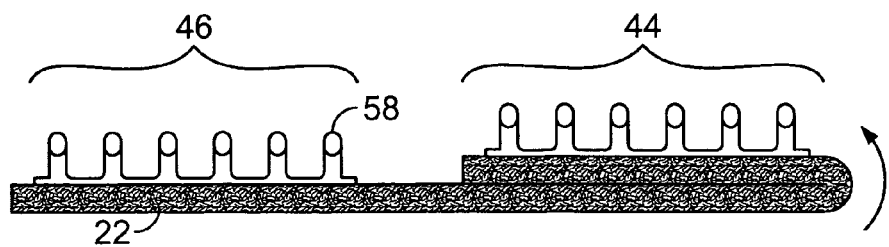
FIGS. 4A-4B are cross-sectional views, taken along lines 4A-4A and 4B-4B, respectively, in FIG. 3A.
Figure 4B:
Figure 4C:
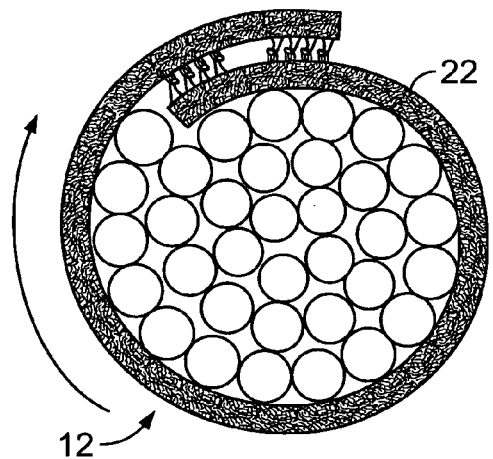
FIG. 4C is a cross-section of the fastener product shown in FIGS. 4A and 4B wrapped about a bundle of wires.

Referring to FIGS. 3A and 3B, a similar manufacturing system 10 is employed to produce a fastener product 12 with hooks 58 on both of two opposing surfaces of the fastener product. This system only includes a single feed roller 34 because a non-woven fabric is used as the sheet material 22. The sheet feed subsystem 16 feeds folded sheet material 22 into the calender nip 56 with both a longitudinal edge portion 44 and a primary remainder portion 46 exposed to the mold roll 26. In this apparatus, mold cavities are arranged to correspond with both the longitudinal edge portion 44 and the primary remainder portion 46. Referring to FIGS. 4A-4C, this system provides a self-engaging fastener product 12 whose hooks 58 can be releasably engage other portions of the non-woven material 24 from which the hooks extend. This allows for dual-engagement fastening that is anticipated to provide additional fastening strength. The hooks 58 may pull portions of the non-woven material 24 outward (as shown in an exaggerated sense in FIG. 4C) or the hooks 58 may be partially or completely embedded in the non-woven material 24.

Figure 5A:
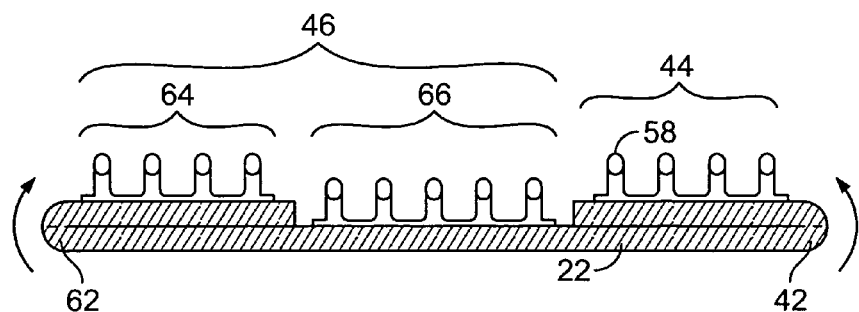
FIGS. 5A and 5B are cross-sections of another fastener product, before and after unfolding.
Figure 5B:
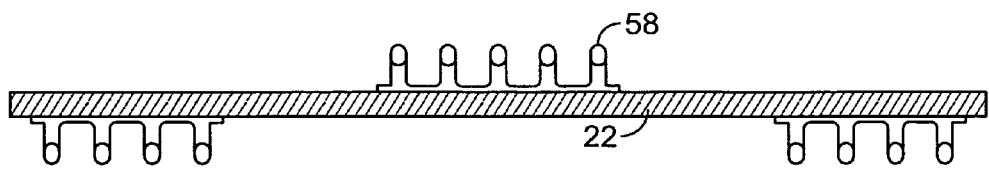

Referring to FIGS. 5A-5C, a variation of the above-described method produces fastener products 12 with hooks 58 on both sides. In this approach, the sheet material is first folded about a first longitudinal fold line 42 to form a first longitudinal edge portion 44 overlapping only a first adjacent portion of the sheet material, leaving another portion of the sheet material exposed as a primary remainder portion 46.

The sheet material 22 is then folded about a second longitudinal fold line 62 in the primary remainder portion to form a second longitudinal edge portion 64 overlapping only a second adjacent potion of the primary remainder portion, leaving another portion of the primary remainder portion exposed as a secondary remainder portion 66. Thus, fastener elements can be molded on both edge portions 44, 64 and the secondary remainder portion 66. The resulting fastener product can be used in applications including, for example, as connector strips to join pieces of felted materials in craft making.

Figure 6A:
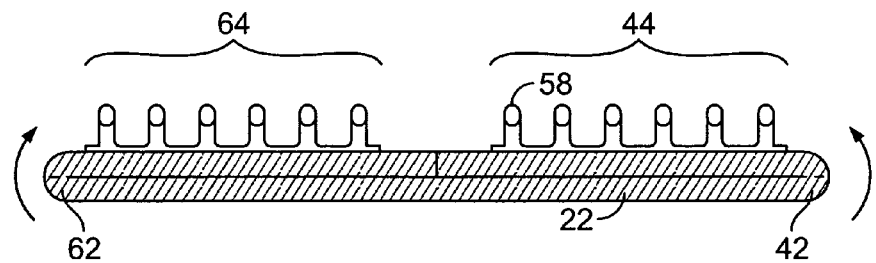
FIGS. 6A and 6B are cross-sections of wide, one-sided fastener product before and after unfolding.
Figure 6B:
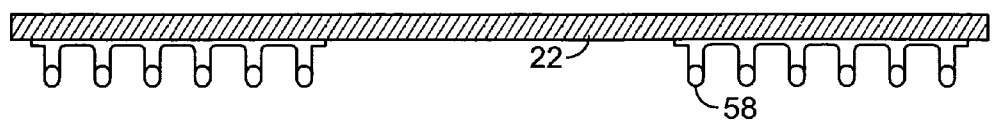

Referring to FIGS. 6A and 6B, another variation of the above-described method produces wide, single-sided fastener products. In this approach, the sheet material is folded twice with the second longitudinal fold line 62 bisecting the primary remainder portion (not shown) to form a second longitudinal edge portion 64. Thus, the second longitudinal edge portion 64 abuts the first longitudinal edge portion 44. Such wide fastener products are useful for applications such as straps extending around a pregnant woman's abdomen for supporting fetal monitors.

Figure 7A:
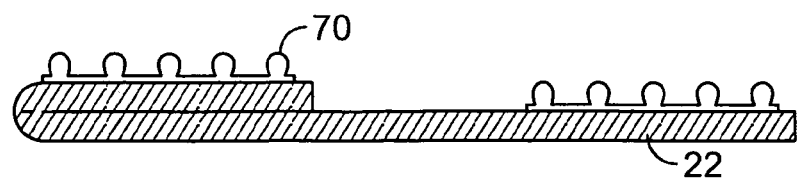
FIGS. 7A-7C are sequential cross-sections of a sheet material illustrating the forming of a fastener product with mushroom fastener elements.
Figure 7B:
Figure 7C:
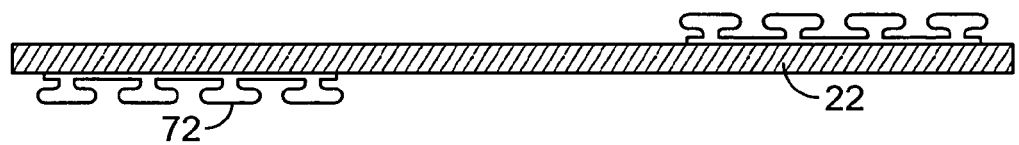
Figure 7D:
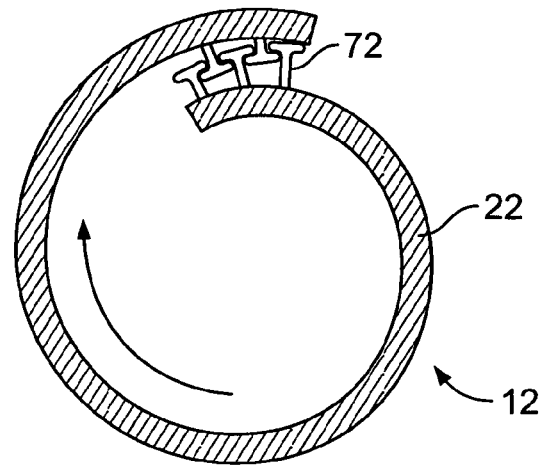
FIG. 7D is a cross-section of the fastener product shown in FIGS. 7A-7C with fastener elements of opposite sides engaged to hold the product in wrapped form.

The above methods are also applicable to the formation of fastener products with fastener elements formed by deforming molded performs, such as stems 70 of FIGS. 7A and 7B. Referring also to FIG. 2A, flat-topping rolls 68 apply heat and pressure to the tops of the stems 70 to form engageable, such as the mushroom-type fastener elements 72 shown in FIG. 7C. Such fastener elements can be adapted to engage loop materials or can be adapted to engage fields of similar fastener elements, as shown in FIG. 7D.

A number of embodiments of the invention have been described. Nevertheless, it will be understood that various modifications may be made without departing from the spirit and scope of the invention. For example, a low profile warp knit, such as Loop 3905 commercially available from Velcro USA Inc. located in Manchester, N.H. can be used as the sheet material 22. However, the illustrated system and method uses other types of sheet materials as a substrate including, for example, film and paper as well as woven and non-woven fabrics including stretchy portions.

Fastener products for manufacturing packaging with sealable enclosures are made using the methods described above with paper and/or film sheets as the substrate. In some applications, the packaging for a salable item is die-cut from sheets of packaging fastener products produced as described above. In other applications, these fastener products are used to form closures for consumer packaging that is predominantly formed from other materials that the fastener products are attached to by, for example, lamination or adhesives. By using heavier plastic materials as a substrate, fastener products are formed that are useful in producing sealable bags such as for storage of food or disposal of waste.

Fastener products for uses such as diaper tabs are made using the methods described above with stretchy materials as a substrate. Moreover, by efficiently producing wider products for a given calender molding apparatus, it is possible to make fastener products that, when unfolded, are wide enough to be die cut to form a chassis or top sheet for disposable garments such as diapers, wearable undergarments, or hospital gowns.

The fastener products described above include continuous longitudinal bands of fastener elements. However, similar methods can be implemented to form fastener products with fastener elements disposed in longitudinally discrete islands rather than longitudinally continuous bands. For example, spaced apart amounts of resin could be introduced to the mold roll to fill separated groups of mold cavities. As discussed above, this forms fastener elements extending from a resin base attached to the preformed material. However, the resin base is discontinuous and can have a set of parting lines or regions. The resulting fastener products can be used in applications including, for example, closure tabs for disposable garments and wrap ties.

Similarly, the embodiments discussed above describe molding portions of fastener elements to one portion of a folded sheet material while bonding additional material (e.g., laminating loop material or in-situ molding and laminating hooks) to another portion of the folded sheet material. Bonding additional material to the sheet material can also include, for example, laminating a preformed strip with fastener elements, such as hooks, loops, or stems with loop-engageable heads, to the sheet material. Accordingly, other embodiments are within the scope of the following claims.

What is claimed is:

1. A method for forming a fastener product having multiplicities of fastener elements extending from a strip form base, the method comprising:
   folding a sheet material about a first longitudinal fold line to form a first longitudinal edge portion overlapping only a first adjacent portion of the sheet material, leaving another portion of the sheet material exposed as a primary remainder portion;
   continuously introducing the folded sheet material to a gap defined adjacent to a peripheral surface of a rotating mold roll, while
   introducing moldable resin between the sheet material and the mold roll, such that the resin fills a field of fixed cavities defined in the rotating mold roll to form a field of molded stems bonded to one of the first longitudinal edge portion and the primary remainder portion such that the molded stems are formed over the sheet material and extend outward over the sheet material, while
   introducing an additional material to the gap, such that the additional material is bonded to the other of the first longitudinal edge portion and the primary remainder portion;
   forming engageable heads on the molded stems;
   solidifying the resin; and then
   stripping the solidified resin from the peripheral surface of the mold roll by pulling the stems from their respective cavities.

2. The method of claim 1 further comprising, after stripping, unfolding the sheet material to its original width.

3. The method of claim 1 wherein the engageable heads are formed by molding the heads on the stems in the cavities of the mold roll.

4. The method of claim 1 wherein the engageable heads are formed by deforming resin of the molded stems after stripping the solidified resin from the peripheral surface of the mold roll.

5. The method of claim 4 wherein the stems are formed into fastener elements by applying heat and pressure to distal ends of the stems.

6. The method of claim 1 wherein bonding an additional material to the other of the first longitudinal edge portion and the primary remainder portion comprises introducing moldable resin between the sheet material and the mold roll, to fill a second field of fixed cavities defined in the rotating mold roll and form a second field of molded stems bonded to the other of the first longitudinal edge portion and the primary remainder portion.

7. The method of claim 1 wherein bonding an additional material to the other of the first longitudinal edge portion and the primary remainder portion comprises introducing a loop material between the sheet material and the mold roll, such that the loop material is laminated to the other of the first longitudinal edge portion and the primary remainder portion.

8. The method of claim 7 wherein the loop material is a non-woven fabric.

9. The method of claim 1 wherein the gap comprises a nip defined between the rotating mold roll and a counter-rotating pressure roll.

10. A method for forming a fastener product having multiplicities of fastener elements extending from a strip form base, the method comprising:
- folding a sheet material about a first longitudinal fold line to form a first longitudinal edge portion overlapping only a first adjacent portion of the sheet material, leaving another portion of the sheet material exposed as a primary remainder portion;
- folding the sheet material about a second longitudinal fold line in the primary remainder portion to form a second longitudinal edge portion overlapping a second adjacent portion of the primary remainder portion;
- continuously introducing the folded sheet material to a gap defined adjacent to a peripheral surface of a rotating mold roll, while
- introducing moldable resin between the sheet material and the mold roll, such that the resin fills an field of fixed cavities defined in the rotating mold roll to form an field of molded stems bonded to one of the first longitudinal edge portion and the second longitudinal edge portion such that the molded stems are formed over and extend outward over the sheet material, while
- introducing an additional material to the gap, such that the additional material is bonded to the other of the first longitudinal edge portion and the second longitudinal edge portion;
- forming engageable heads on the molded stems;
- solidifying the resin; and then
- stripping the solidified resin from the peripheral surface of the mold roll by pulling the stems from their respective cavities.

11. The method of claim 10 wherein the second longitudinal fold line bisects the primary remainder portion such that the second longitudinal edge portion abuts the first longitudinal edge portion.

12. The method of claim 11 wherein the field of molded stems is bonded to the second longitudinal edge portion.

13. The method of claim 12 wherein the additional material bonded to the first longitudinal edge portion.

14. The method of claim 13 wherein introducing the additional material comprises introducing moldable resin between the sheet material and the mold roll, to fill a second field of fixed cavities defined in the rotating mold roll and form a second field of molded stems bonded to the other of the first longitudinal edge portion and the second longitudinal edge portion.

15. The method of claim 13 wherein introducing the additional material comprises introducing a loop material between the sheet material and the mold roll, such that the loop material is laminated to the other of the first longitudinal edge portion and the second longitudinal portion.

16. The method of claim 10 wherein a portion of the primary remainder portion adjacent to the overlapped first adjacent portion remains exposed to the mold roll.

17. The method of claim 16 wherein the field of molded stems is bonded to the first longitudinal edge portion.

18. The method of claim 17 wherein the additional material is bonded to the second longitudinal edge portion.

19. The method of claim 18 wherein introducing the additional material comprises introducing moldable resin between the sheet material and the mold roll, to fill a second field of fixed cavities defined in the rotating mold roll and form a second field of molded stems bonded to the second longitudinal edge portion.

20. The method of claim 18 wherein introducing the additional material comprises introducing a loop material between the sheet material and the mold roll, such that the loop material is laminated to the second longitudinal edge portion.

* * * * *